United States Patent [19]

Hirano

[11] Patent Number: 5,513,265
[45] Date of Patent: Apr. 30, 1996

[54] MULTI-CHANNEL ECHO CANCELLING METHOD AND A DEVICE THEREOF

[75] Inventor: Akihiro Hirano, Tokyo, Japan

[73] Assignee: NEC Corporation, Tokyo, Japan

[21] Appl. No.: 251,236

[22] Filed: May 31, 1994

[30] Foreign Application Priority Data

May 31, 1993 [JP] Japan .................. 5-167261

[51] Int. Cl.$^6$ .................................. H04B 3/20
[52] U.S. Cl. .................. 381/66; 381/94; 379/410; 379/411; 379/202; 379/206
[58] Field of Search .................. 381/66, 94; 379/410, 379/411, 406, 412, 402, 202–206

[56] References Cited

U.S. PATENT DOCUMENTS

| | | | |
|---|---|---|---|
| 5,305,309 | 4/1994 | Chujo | 379/411 |
| 5,323,459 | 6/1994 | Hirano | 381/66 |
| 5,371,789 | 12/1994 | Hirano | 379/410 |

FOREIGN PATENT DOCUMENTS 0012728 1/1989 Japan .................. 381/66

Primary Examiner—Curtis Kuntz
Assistant Examiner—Minsun Oh
Attorney, Agent, or Firm—Sughrue, Mion, Zinn, Macpeak & Seas

[57] ABSTRACT

The present invention relates to a multi-channel echo cancelling art enabling proper operation even if using a microphone not generating propagation delay difference between channels. The present invention comprises: a step of calculating a power of reception signal in each reception channel and selecting a reception channel of a reception signal having the biggest power; a step of generating an echo replica corresponding to an echo in each mixed signal generated by propagation of reception signals of the reception channels based on a reception signal of the reception channel selected in the previous step; and a step of cancelling the echoes from mixed signals in which the echoes are mixed by subtracting the echo replicas from the mixed signals.

33 Claims, 9 Drawing Sheets

MULTI-CHANNEL ECHO CANCELLING METHOD AND A DEVICE THEREOF

BACKGROUND OF THE INVENTION

The present invention relates to a multi-channel echo cancelling method and a device thereof.

For a multi-channel echo cancelling method and a device thereof for cancelling an echo generated by propagation of reception signals in spatial acoustic paths, in a system having a plurality of reception signals and at least one transmission signal, a cascade connection type and a linear connection type are proposed in CS-84-178 (hereinafter referred to as Paper 1), pp.7–4, No.330, Vol.84 of the technical report of the Institute of Electronics and Communication Engineers.

The following problems, however, are pointed out in A5-3 (hereinafter referred to as Paper 2), pp.144–149, of proceedings of the 6-th digital signal processing symposium, that is, the cascade connection type and the linear connection type have following defects:

(1) its hardware size becomes large because its hardware size is in proportion to square of the number of channels;

(2) convergence of adaptive filters becomes slow when reception signals have strong cross-correlation; and (3) coefficients of the adaptive filters may not converge to optimal values when reception signals have strong cross-correlation.

To solve these problems, a multi-channel echo canceller comprising an adaptive filter for each channel is proposed in A-202 (hereinafter referred to as Paper 3), pp.202, volume 1 of proceedings of the 1991 Institute of Electronics, Information and Communication Engineers spring conference.

Next, according to Paper 3, the case of applying this multi-channel echo canceller to a teleconference system, in which both of the reception signals and the transmission signals have two channels respectively, is explained.

FIG. 10 shows a block diagram of voice section of a two-channel teleconference system connecting two teleconference rooms 20 and 21.

An acoustic echo cancelling method in the first teleconference room 20 is explained here for an example.

Let us suppose that the second talker 9 is in the second teleconference room 21. The voice $10_1$ of the second talker 9 passes through the spatial acoustic path is recorded by the third microphone $11_1$ and is supplied to the second echo canceller $120_2$.

The voice recorded by the third microphone $11_1$ is sent to the first teleconference room 20 as the first reception signal $1_1$. Similarly to this, the voice $10_2$ of the second talker 9 passes through the spatial acoustic path and is recorded by the fourth microphone 112, and is supplied to the second echo canceller $120_2$. The voice recorded by the fourth microphone $11_2$ is sent to the first teleconference room 20 as the second reception signal 12.

In the first teleconference room 20, the first reception signal $1_2$ is played back by the first loudspeaker $2_1$, passes through the spatial acoustic path and comes to the first microphone $3_1$ and the first echo $7_1$ is generated at this time. The second reception signal $1_2$ is played back by the second loudspeaker $2_2$, passes through the spatial acoustic path and comes to the first microphone $3_1$ and the second echo $7_2$ is generated at this time. The echoes $7_1$, $7_2$ and the first transmission signal $8_1$ that is the voice of the first talker 6 come to the first microphone $3_1$ are added and become the first mixed signal $4_1$.

Similarly to this, the first reception signal $1_1$ is played back by the first loudspeaker $2_1$, passes through the spatial acoustic path and comes to the second microphone $3_2$ and the third echo $7_3$ is generated at this time. The second reception signal $1_2$ is played back by the second loudspeaker $2_2$, passes through the spatial acoustic path and comes to the second microphone $3_2$ and the fourth echo $7_4$ is generated at this time. The echoes $7_3$, $7_4$ and the second transmission signal $8_2$ that is the voice of the talker 6 come to the second microphone $3_2$ are added and become the second mixed signal $4_2$.

The first echo canceller $120_1$ is used to remove echoes $7_1$, $7_2$, $7_3$ and $7_4$ contained in the first and second mixed signals $4_1$ and $4_2$.

The propagation delay difference estimation circuit 110 receives the first reception signal $1_1$ and the second reception signal $1_2$, estimates a propagation delay difference that is a difference between propagation delays of voices $10_1$ and $10_2$ of the second talker 9 until reaching to the first teleconference room 20 from the second teleconference room 21, and supplies the result to the reception signal selection circuit 111.

The reception signal selection circuit 111, based on an estimation result of said propagation delay difference estimation circuit 110, detects a reception signal having shorter propagation delay from two reception signals $1_1$ and $1_2$. And it supplies the detection result as a designated reception signal selection information to the selector 105.

The selector 105 receives the first and the second reception signals $1_1$ and $1_2$, selects the reception signal 106 that is designated by said reception signal selection information from the two reception signals $1_1$ and $1_2$. And it supplies the result to the first adaptive filter $112_1$ and the second adaptive filter $112_2$.

The first adaptive filter $112_2$ receives the reception signal 106 selected by the selector 105, generates the echo replica $108_1$ corresponding to an echo contained in the first mixed signal $4_1$, and supplies it to the first subtracter $109_1$.

The first subtracter $109_1$ subtracts the echo replica $108_1$ that is an output of the first adaptive filter $112_2$ from the first mixed signal $4_1$ and lets the result be the first output signal $5_1$.

The first adaptive filter $112_2$ is controlled so as to make the first output signal $5_1$ be minimized.

Similarly to this, the second adaptive filter $112_2$ receives the reception signal 106 selected by the selector 105, generates the echo replica $108_2$ corresponding to an echo contained in the second mixed signal $4_2$, and supplies a result to the second subtracter $109_2$.

The second subtracter $109_2$ subtracts the echo replica $108_2$ that is an output of the second adaptive filter $112_2$ from the second mixed signal $4_2$ and lets the result be the second output signal $5_2$.

Here, the second adaptive filter $112_2$ is controlled so as to make the second output signal $5_2$ be minimized.

A conventional multi-channel echo canceller supposes that the propagation delay between the first reception signal $1_1$ and the second reception signal $1_2$ changes according to location of the second talker 9 in the second teleconference room 21.

However, there may be a microphone that scarcely generates propagation delay difference although generates power difference according to location of the second talker 9. When such a microphone is used, a conventional multi-channel echo canceler can not select an appropriate reception signal, so that it can not work properly. This has been a problem.

SUMMARY OF THE INVENTION

An object of the present invention is to offer multi-channel echo cancelling methods and devices thereof enabling proper operation even if using a microphone not generating propagation delay difference between channels.

The object mentioned above of the present invention is achieved by a multi-channel echo cancelling method comprising: a step of calculating a power of reception signal in each reception channel and selecting a reception channel of a reception signal having the biggest power; a step of generating an echo replica corresponding to an echo in each mixed signal generated by propagation of reception signals of said reception channels based on said reception signal of the reception channel selected in the previous step for each reception channel; and a step of cancelling said echo from said mixed signal by subtracting said echo replica from said mixed signal for each reception channel.

It is to be noted that it is preferable that said step of calculating a power of reception signal in each reception channel and selecting a reception channel of a reception signal having the biggest power calculates a square value of reception signal in each reception channel and selects a reception channel having the biggest square value, or calculates an instantaneous power of reception signal in each reception channel and selects a reception channel having the biggest instantaneous power.

Moreover, it is preferable that said step of calculating a power of reception signal in each reception channel and selecting a reception channel of a reception signal having the biggest power calculates a mean value of powers of reception signals in each reception channel and selects a reception channel having the biggest mean value of powers.

Moreover, it is good that said step of calculating a power of reception signal in each reception channel and selecting a reception channel of a reception signal having the biggest power calculates powers of reception signals in each reception channel, sorts the results and selects a reception channel having the biggest median value of powers, or calculates a mode of powers of reception signals in each reception channel and selects a reception channel having the biggest mode of powers.

Moreover it is preferable that said step of generating an echo replica corresponding to an echo in each mixed signal generated by propagation of reception signals of said reception channels based on said reception signal of the reception channel selected in the previous step for each reception channel supplies said reception signal of the selected reception channel to adaptive filters that are one-to-one corresponding to said mixed signals and generates said echo replicas using said adaptive filters.

Further, the object mentioned above of the present invention is achieved by a multi-channel echo cancelling method comprising: a step of calculating an absolute value of reception signal in each reception channel and selecting a reception channel of a reception signal having the biggest absolute value; a step of generating an echo replica corresponding to an echo in each mixed signal generated by propagation of reception signals of said reception channels based on said reception signal of the reception channel selected in the previous step for each reception channel; and a step of cancelling said echo from said mixed signal by subtracting said echo replica from said mixed signal for each reception channel.

It is to be noted that said step of calculating an absolute value of reception signal in each reception channel and selecting a reception channel of a reception signal having the biggest absolute value calculates a mean value of absolute values of reception signals in each reception channel and selects a reception channel having the biggest mean value of absolute values.

Moreover it is preferable that said step of calculating an absolute value of reception signal in each reception channel and selecting a reception channel of a reception signal having the biggest absolute value calculates absolute values of reception signals in each reception channel, sorts the results and selects a reception channel having the biggest median value of absolute values, or calculates a mode of absolute values of reception signals in each reception channel and selects a reception channel having the biggest mode of absolute values.

Moreover, it is to be noted that said step of generating an echo replica corresponding to an echo in each mixed signal generated by propagation of reception signals of said reception channels based on said reception signal of the reception channel selected in the previous step for each reception channel supplies said reception signal of the selected reception channel to adaptive filters that are one-to-one corresponding to said mixed signals and generates said echo replicas using said adaptive filters.

The object mentioned above of the present invention is achieved by a multi-channel echo cancelling device comprising: a reception signal selection means for calculating a power of reception signal in each reception channel and selecting a reception channel of a reception signal having the biggest power; a means for generating an echo replica corresponding to an echo in each mixed signal generated by propagation of reception signals of said reception channels based on said reception signal of the reception channel selected by said reception signal selection means for each reception channel; and a means for cancelling said echo from said mixed signal by subtracting said echo replica from said mixed signal for each reception channel.

It is to be noted that it is preferable that said means for calculating a power of reception signal in each reception channel and selecting a reception channel of a reception signal having the biggest power comprises: a plurality of power calculation means, one-to-one corresponding to each reception signal, for calculating a power of reception signal of said reception channel; a reception channel selection means for selecting a reception channel having the biggest power of reception signal based on the calculation result from said power calculation means; and a selection means for receiving reception signals of reception channels and outputting a reception signal of a selected reception channel based on the selected result by said reception channel selection means.

Moreover, it is preferable that said power calculation means comprises a multiplication means for receiving a reception signal of said reception channel and squaring this reception signal and outputting a result.

Moreover, it is preferable that said power calculation means comprises: a multiplication means for receiving a reception signal of said reception channel and squaring this reception signal and outputting a result; and a mean calculation means for storing square values calculated by said multiplication means and calculating a mean power of reception signal from said square values.

Moreover, it is good that said power calculation means comprises: a multiplication means for receiving a reception signal of said reception channel and squaring this reception signal and outputting a result; a register means for storing square values calculated by said multiplication means; and a sorting means for sorting square values stored in said register means and outputting an median value of the sorted square values, or also comprises: a multiplication means for receiving a reception signal of said reception channel and squaring this reception signal and outputting a result; a register means for storing square values calculated by said multiplication means; a histogram means for calculating a histogram from square values stored in said register means; and a maximum value detection means for outputting a representative value of a zone having maximum value in said histogram.

Moreover, it is preferable that said means for generating an echo replica corresponding to an echo in each mixed signal generated by propagation of reception signals of said reception channels, based on said reception signal of the reception channel selected by said reception signal selection means, comprises a plurality of adaptive filters one-to-one corresponding to said mixed signals.

Moreover, it is preferable that said adaptive filter is an adaptive transversal filter based on the LMS algorism or an adaptive transversal filter based on the learning identification method.

Moreover, it is preferable that said means for cancelling said echo from said mixed signal by subtracting said echo replica from said mixed signal for each reception channel comprises a plurality of subtraction means, one-to-one corresponding to said mixed signals, for subtracting said echo replica from said mixed signal.

The object mentioned above of the present invention is achieved by a multi-channel echo cancelling device comprising: a means for calculating an absolute value of reception signal in each reception channel and selecting a reception channel of a reception signal having the biggest absolute value; a means for generating an echo replica corresponding to an echo in each mixed signal generated by propagation of reception signals of said reception channels based on said reception signal of the reception channel selected by said reception signal selection means for each reception channel; and a means for cancelling said echo from said mixed signal by subtracting said echo replica from said mixed signal for each reception channel.

It is to be noted that said means for calculating an absolute value of reception signal in each reception channel and selecting a reception channel of a reception signal having the biggest absolute value comprises: a plurality of absolute value calculation means, one-to-one corresponding to each reception signal, for calculating an absolute value of reception signal of said reception channel; a reception channel selection means for selecting a reception channel having the biggest absolute value of reception signal based on the calculation result from said absolute value calculation means; and a selection means for receiving reception signals of reception channels and outputting a reception signal of a selected reception channel based on the selected result by said reception channel selection means.

Moreover, it is preferable that an absolute value calculation means for calculating an absolute value of a reception signal of said reception channel for each reception channel; and a mean calculation means for storing absolute values calculated by said absolute value calculation means and calculating a mean value of absolute values of a reception signal from said absolute values.

Moreover it is good that said absolute value calculation means comprises: an absolute value calculation means for calculating an absolute value of a reception signal of said reception channel for each reception channel; a register means for storing absolute values calculated by said absolute value calculation means; and a sorting means for sorting absolute values stored in said register means and outputting an median value of the sorted square values, or also comprises: an absolute value calculation means for calculating an absolute value of a reception signal of said reception channel for each reception channel; a register means for storing absolute values calculated by said absolute value calculation means; a histogram means for calculating a histogram from absolute values stored in said register means; and a maximum value detection means for outputting a representative value of a zone having maximum value in said histogram.

Moreover, it is good that said means for generating an echo replica corresponding to an echo in each mixed signal generated by propagation of reception signals of said reception channels based on said reception signal of the reception channel selected by said reception signal selection means comprises a plurality of adaptive filters one-to-one corresponding to said mixed signals.

Moreover, it is preferable that said adaptive filter is an adaptive transversal filter based on the LMS algorism or an adaptive transversal filter based on the learning identification method.

Moreover, it is preferable that said means for cancelling said echo from said mixed signal by subtracting said echo replica from said mixed signal for each reception channel comprises a plurality of subtraction means, one-to-one corresponding to said mixed signals, for subtracting said echo replica from said mixed signal.

The object mentioned above of the present invention is achieved by a multi-channel echo cancelling device comprising: a plurality of power calculation means, one-to-one corresponding to each reception signal, for calculating a power of reception signal of said reception channel; a reception channel selection means for selecting a reception channel having the biggest power of reception signal based on the calculation result from said power calculation means; a selection means for receiving reception signals of reception channels and outputting a reception signal of a selected reception channel based on the selected result by said reception channel selection means; a plurality of adaptive filters, one-to-one corresponding to mixed signals in which echoes generated by propagation of reception signals of said reception channels are mixed, for generating echo replicas corresponding to said echoes based on a reception signal supplied by said selection means; and a plurality of subtraction means, one-to-one corresponding to said mixed signals, for outputting a result by subtracting said echo replicas from said mixed signals.

Moreover, it is good that said power calculation means is substituted by said absolute value calculation means for calculating an absolute value of a reception signal of said reception channel.

The multi-channel echo cancelling method and the device thereof of the present invention can properly operate even if using a microphone not generating a propagation delay difference between channels, because the method and device can select a reception signal, based on a power difference between reception signals.

BRIEF DESCRIPTION ON DRAWINGS

DETAILED DESCRIPTION OF THE INVENTION

The embodiment of the present invention is explained in detail, taking an acoustic echo cancelling method for cancelling acoustic echo recorded with microphones after propagation of reception signals through spatial acoustic paths from loudspeakers.

Figure 1:
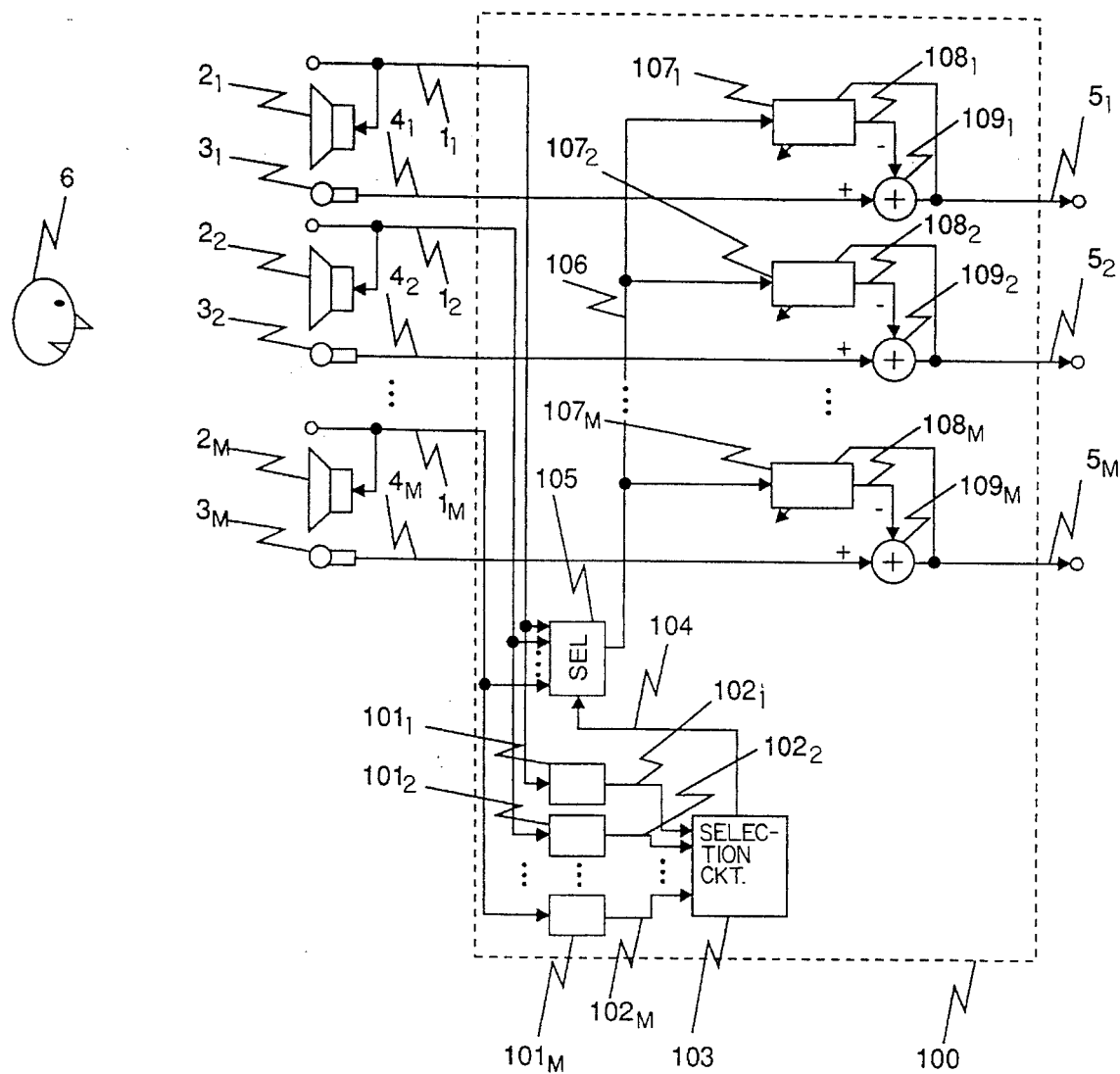
FIG. 1 is a block diagram of the first embodiment of the present invention.

FIG. 1 shows the first embodiment of the present invention that reception signal and transmission signal have M channels, respectively.

In this FIG. $1_1, \ldots, 1_M$ are reception signals of M channels.

$2_1, \ldots, 2_M$ are M units of loudspeakers that outputs corresponding reception signals $1_1, \ldots, 1_M$.

$3_1, \ldots, 3_1$ are M units of microphones that records voice of the talker 6.

$4_1, \ldots, 4_M$ are mixed signals of M channels. These mixed signals $4_1, \ldots, 4_M$ are generated by adding echos and the voice of the talker 6 to be recorded by the microphones $3_1, \ldots, 3_M$. Where, these echos are generated at the time when the played back reception signals $1_1, \ldots, 1_M$ by the loudspeakers $2_1, \ldots, 2_M$ have come to the microphones $3_1, \ldots, 3_M$ through spatial acoustic paths.

100 is a multi-channel echo canceller.

$101_1, \ldots, 101_M$ are M units of power calculation circuits one-to-one corresponding to reception signals $1_1, \ldots, 1_M$, calculate corresponding reception signal's powers $102_1, \ldots, 102_m$. Now, as the power calculation circuits $101_1, \ldots, 101_M$ have same configuration and operate similarly, only the arbitrary i-th ($1 \leq i \leq M$) power calculation circuit $101_i$ is explained.

Figure 2:
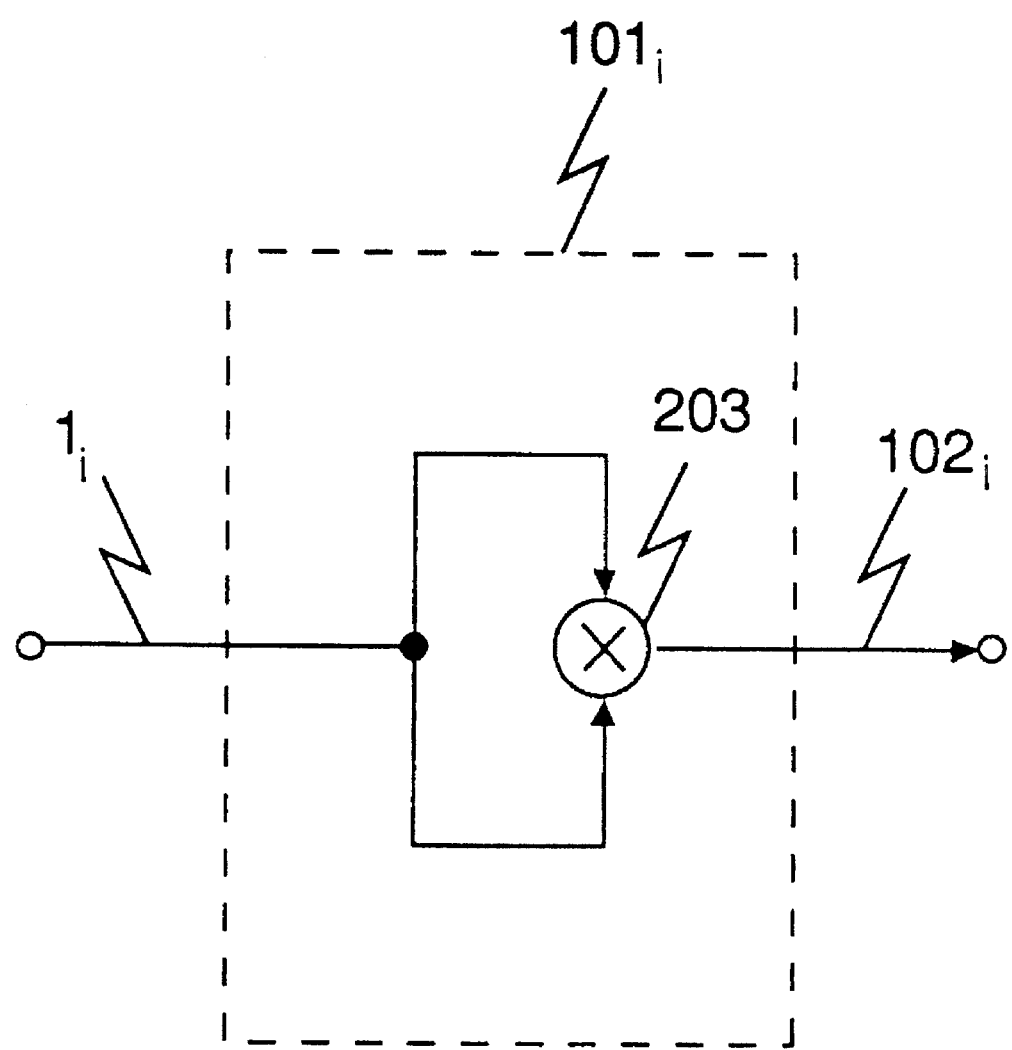
FIG. 2 is a block diagram of the first embodiment of a power calculation circuit.

FIG. 2 shows a block diagram of the power calculation circuit $101_i$.

This power calculation circuit $101_i$ is configured so as to calculate an instantaneous power of the reception signal li, square the reception signal $1_i$ supplied to the power calculation circuit $101_1$ by the multiplier 203 and output the result as the power $102_i$ of the reception signal $1_i$.

103 is a selection circuit that detects a reception signal having the biggest power based on the reception signal powers $102_1, \ldots, 102_M$ calculated by the power calculation circuits $101_1, \ldots, 101_M$, outputs the selection information 104.

105 is a selector that receives the M channels' reception signals $1_1, \ldots, 1_M$, selects and outputs the reception signal 106 having the biggest power based on the selection information 104.

$107_1, \ldots, 107_M$ are M units of adaptive filters one-to-one corresponding to the mixed signals $4_1, \ldots, 4_M$, receive the reception signal 106 having the biggest power and calculate echo replicas $108_1, \ldots, 108_M$, respectively.

$109_1, \ldots, 109_M$ are M units of subtracters one-to-one corresponding to the mixed signals $4_1, \ldots, 4_M$, subtract the echo replicas $108_1, \ldots, 108_M$ from the mixed signals $4_1, \ldots, 4_M$, output the results as the output signals $5_1, \ldots, 5_M$, respectively.

Now, as the adaptive filters $107_1, \ldots, 107_M$ and the subtracters $109_1, \ldots, 109_M$ have same configuration and operate similarly, only the arbitrary i-th ($1 \leq i \leq M$) adaptive filter $107_i$ and the subtracter $109_i$ is explained in detail.

First, the embodiment of the adaptive filter $107_i$ is explained.

For an example of an adaptive filter, an adaptive transversal filter based on the LMS algorism is written in the Proceedings of the IEEE, Vol. 63, No. 12, pp. 1692–1716, 1975, USA (hereinafter referred to as Paper 4). And an adaptive transversal filter based on learning identification method is written in the IEEE transactions on automatic control, Vol. AC-12, No.3, 1967, USA (hereinafter referred to as Paper 5). Using adaptive transversal filter based on the LMS algorism, an operation and an embodiment of the adaptive filter are explained, here.

First, an adaptive transversal filter based on the LMS algorism is explained.

Supposing that the number of taps of the adaptive filter is N, an input signal to the adaptive filter at the time n is x (n), an output signal of the adaptive filter is y(n), an error signal is e(n) and the i-th filter coefficient is w(i,n) (i=0, ..., N-i), an output signal is represented by the equation (1).

$$y(n) = \sum_{i=0}^{N-1} w(i,n)x(n-i). \quad (1)$$

Also, updating of the filter coefficient is given by the following equation.

$$w(i,n+1) = w(i, n) + \mu e(n)x(n-i) \quad (2)$$

Above-mentioned processing can be realized by cascade-connecting operation circuits calculating operation for 1 tap.

Next, the j-th operation circuit (j=1, ..., N) receives the delay element input $x_{j-1}$ (n), the adder input $y_{j-1}$ (n) and the filter coefficient update value $\Delta(n)$, then carries out delay processing represented by the equation (3).

$$x_j(n) = x_{j-1}(n-1) \quad (3)$$

Also, it carries out convolution operation represented by the equation (4).

$$x_j(n) = y_{j-1}(n) + w(j-1,n)x_{j-1}(n) \quad (4)$$

Further, it carries out coefficient update represented by the equation (5).

$$w(j-1, n+1) = w(j-1,n) + \Delta(n)x(n-j+1) \quad (5)$$

And it outputs the delay element input $x_j$ (n) and the adder output $x_j$ (n).

Where, $x_0$ (n) and $y_0$ (n) are given as follows.

$$x_0(n) = x(n) \quad (6)$$

$$y_0(n) = 0 \quad (7)$$

And the filter coefficient update value $\Delta(n)$ is defined as below.

$$\Delta(n) = \mu e(n) \qquad (8)$$

Next, the concrete configuration of the adaptive filter $107_i$ applied by an adaptive transversal filter based on the above-mentioned LMS algorism is explained.

Figure 3:
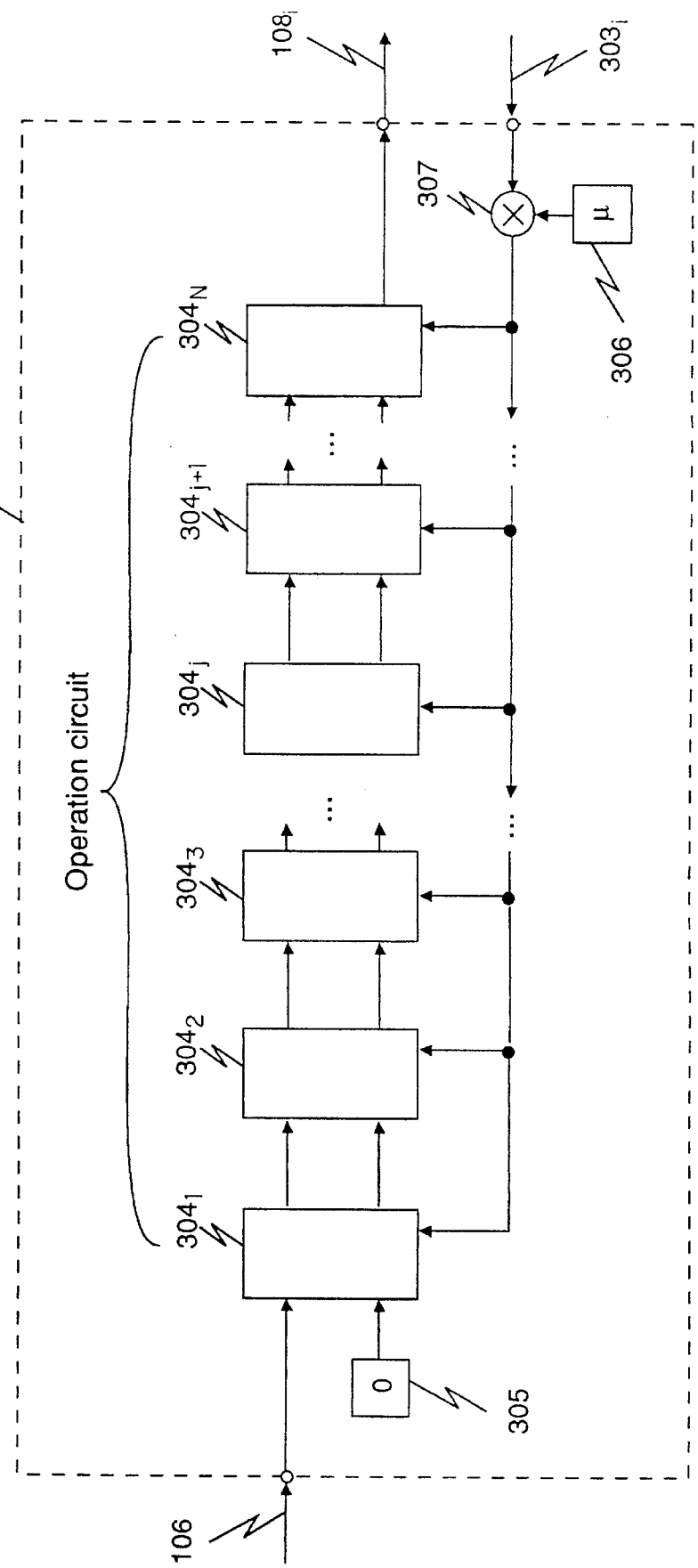
FIG. 3 is a block diagram of a transversal adaptive filter based on the LMS algorism.

FIG. 3 shows a block diagram of the adaptive filter $107_i$.

This adaptive filter $107_i$ receives the reception signal 106 and calculates the echo replica $108_i$. Also, it updates a filter coefficient so as to make the error signal $303_1$ corresponding output signal $5_i$ small.

The input signal 106 is supplied to the first operation circuit $304_1$ as a delay element input.

The first operation circuit $304_1$ receives the reception signal 106 as a delay element input, also receives the constant 0 that is stored in the first constant register 305 as an adder input, performs delay processing, convolution operation, coefficient updating. Then, it supplies the delay element output to the delay element input of the second operation circuit $304_2$ and supplies the adder output to the adder input of the second operation circuit $304_2$.

The second operation circuit $304_2$ receives the delay element output of the first operation circuit as a delay element input, also receives the adder output of the first operation circuit as an adder input, performs delay processing, convolution operation, coefficient updating. And, it supplies the delay element output to the delay element input of the third operation circuit $304_3$ and supplies the adder output to the adder input of the third operation circuit $304_3$.

Similarly to the second operation circuit $304_2$, the j-th operation circuit $304_j$ (J=3, ..., N−1) receives the delay element output of the j−1-th operation circuit as a delay element input, also receives the adder output of the j−1-th operation circuit as an adder input, performs delay processing, convolution operation, coefficient updating. And, it supplies the delay element output to the delay element input of the j+1-th operation circuit $304_{j+1}$, also supplies the adder output to the adder input of the j+1-th operation circuit $304_{j+1}$.

Similarly, the N-th operation circuit $304_N$ receives the delay element output of the N−1-th operation circuit as a delay element input, also receives the adder output of the N−1-th operation circuit as an adder input, performs delay processing, convolution operation, coefficient updating.

Then, the adder output becomes an output signal of the adaptive filter $107_i$, that is, the echo replica $108_i$.

It is to be noted that the delay element output of the N-th operation circuit $304_N$ is not used. Moreover, the multiplier 307 multiplies the error signal $303_1$ that is an output of the subtracter $109_i$ by the content of the constant register 306, supplies the resulted product to the N units of the operation circuits $304_1, \ldots, 304_N$.

Further, if the above-mentioned filter coefficient update value $\Delta(n)$ is the equation (9), it becomes the learning identification method proposed in Paper 5.

$$\Delta(n) = \frac{\mu e(n)}{\sum_{i=0}^{N-1} x^2(n-i)} \qquad (9)$$

Figure 4:
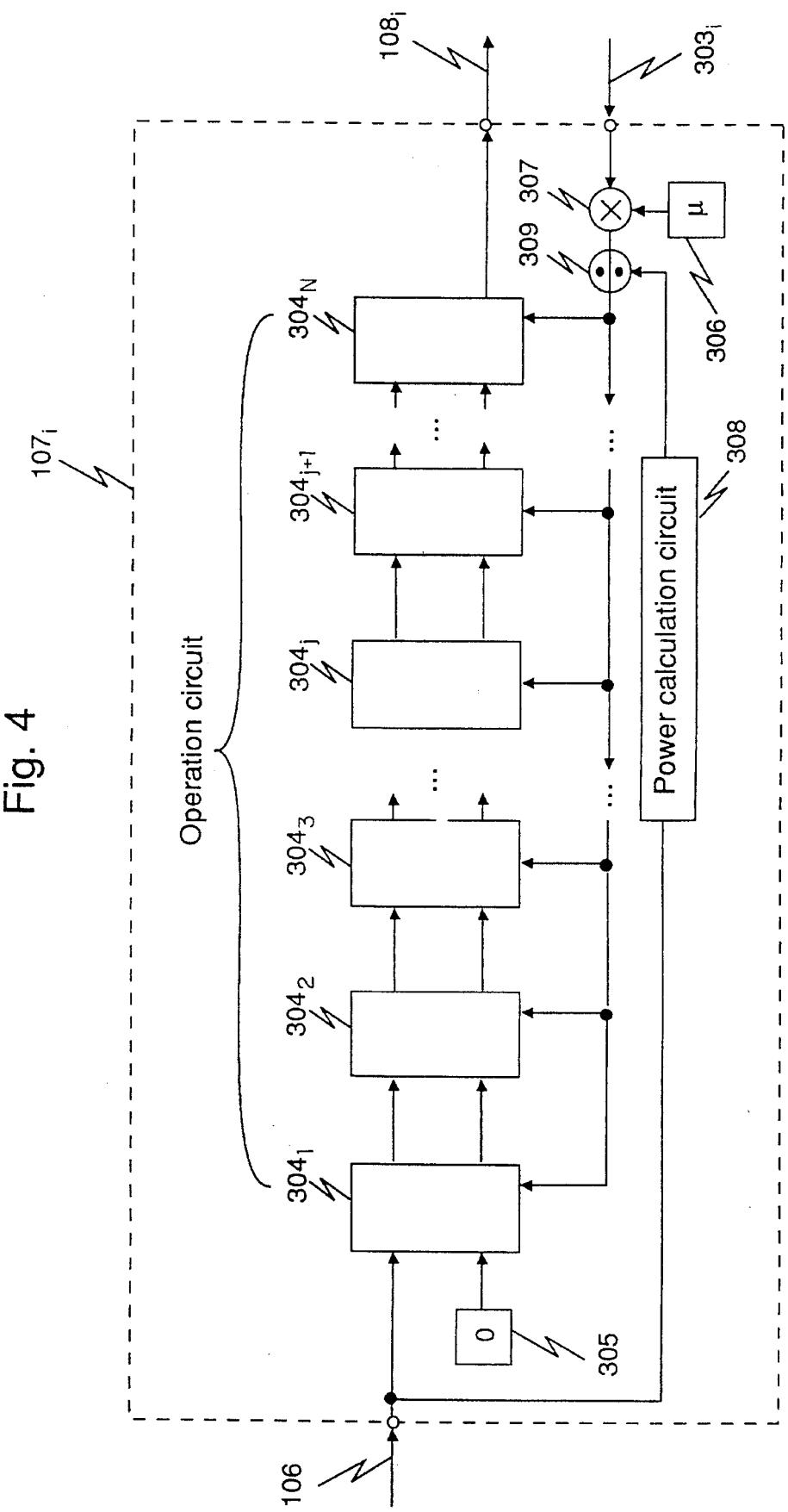
FIG. 4 is a block diagram of a transversal adaptive filter based on the learning identification method.

FIG. 4 shows a block diagram of an adaptive filter that is applied by this leaning identification method.

About this adaptive filter, the above-mentioned power calculation circuit 308 and the divider 309 that receives an output of this power calculation circuit 308 and an output of the subtracter 307 are added to said adaptive filter $107_i$.

Next, the concrete configuration of the operation circuit $304_1, \ldots, 304_N$ is explained.

Figure 5:
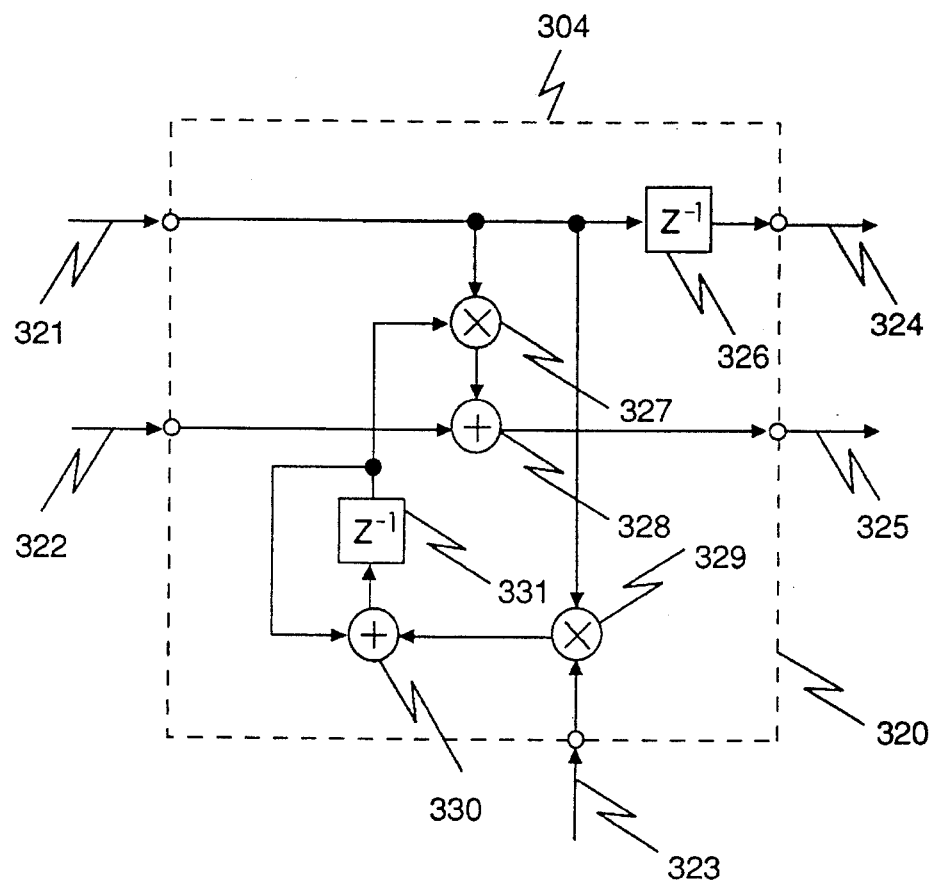
FIG. 5 is a block diagram of an operation circuit.

FIG. 5 is a diagram showing the configuration of the operation circuit 304 of the adaptive filter $107_i$.

This operation circuit 304 receives the delay element input 321, the adder input 322 and the filter coefficient update value 323, performs delay processing, convolution operation and coefficient updating, and outputs the delay element output 324 and the adder output 325.

First, the delay element input 321 is supplied to the delay element 326 and the first multiplier 327. The delay element 326 outputs a delayed version of the delay element input 321 as the delay element output 324.

The first multiplier 327 multiplies the delay element input 321 by the content of the coefficient register 331, and supplies the resulted product to the first adder 328.

The first adder 328 sums up the resulted product of the first multiplier 327 and the adder input 322, and outputs the resulted sum as the adder output 325.

The second multiplier 329 multiplies the delay element input 321 by the filter coefficient update value 323, supplies the resulted product to the second adder 330.

The second adder 330 sums up the resulted product of the second multiplier 329 and the content of the coefficient register 331, and outputs the resulted sum to the coefficient register 331.

The coefficient register 331 stores the resulted sum from the second adder 330.

Next, the adaptive filter $107_i$ configured as above receives the reception signal 106 having the biggest power, calculates the echo replica $108_i$. The calculated echo replica is supplied to the subtracter $109_i$.

The subtracter $109_i$ subtracts the echo replica $108_i$ from the mixed signal $4_i$, outputs the resulted output signal $5_i$ and simultaneously outputs again a part thereof to the adaptive filter $107_i$ as the error signal $303_i$.

By configuring as above, acoustic echoes can be cancelled properly if a microphone not generating propagation delay difference between channels is used.

Next, the second embodiment is explained.

The second embodiment is the same as the first embodiment except for substituting the power calculation circuit in the first embodiment by a power average calculation circuit for calculating a mean power.

It is to be noted that only the arbitrary power calculation circuit $500_i$ is explained briefly because the other parts are the same as those of the first embodiment.

Figure 6:
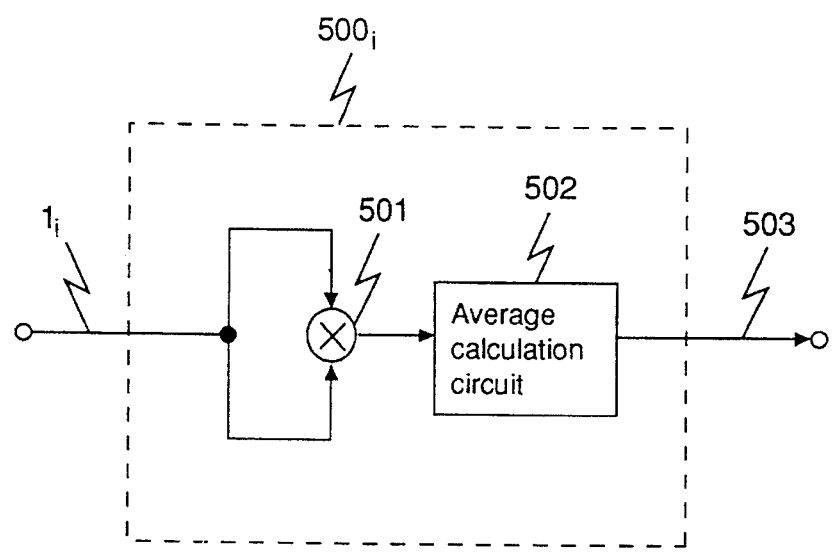
FIG. 6 is a block diagram of the second embodiment of a power calculation circuit.

FIG. 6 shows a block diagram of a power average calculation circuit.

This power calculation circuit $500_i$ calculates the mean power of the reception signal $1_i$. The multiplier 501 squares the reception signal $1_1$ and supplies the result to the average calculation circuit 502.

The average calculation circuit 502 calculates a time average of the calculated products and outputs the result as the mean power 503.

By configuring as above, it is possible to select a reception channel of a reception signal whose power is biggest.

Next, the third embodiment is explained.

The third embodiment is the same as the first embodiment except for substituting the power calculation circuit in the first embodiment by a power calculation circuit for calculating a medianvalue of powers.

It is to be noted that only the arbitrary power calculation circuit $600_i$ is explained briefly because the other parts are the same as those of the first embodiment.

Figure 7:
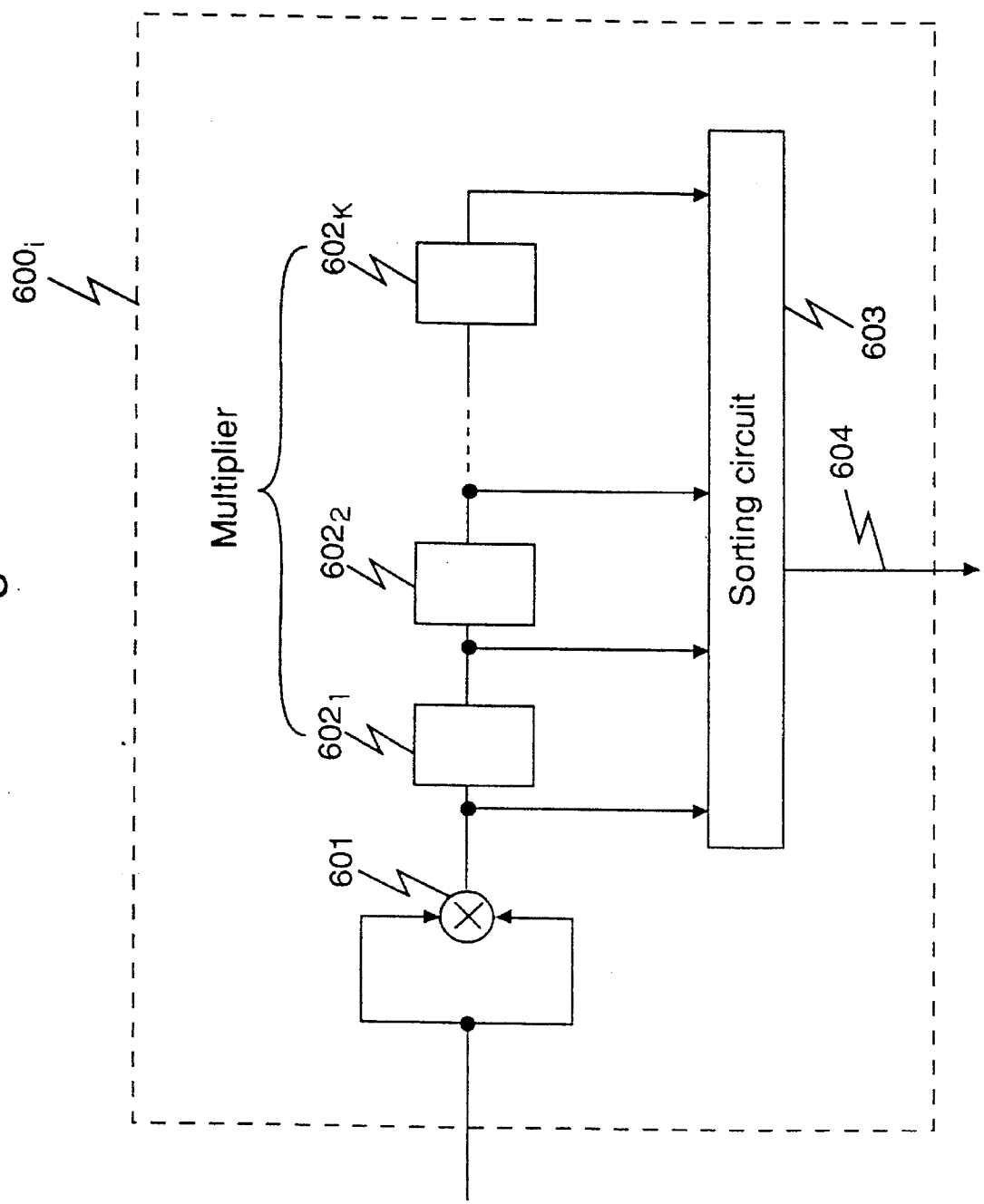
FIG. 7 is a block diagram of the third embodiment of a power calculation circuit.

FIG. 7 shows a block diagram of a power median calculation circuit.

First, the multiplier 601 calculates a power by squaring a reception signal and outputs the result.

The registers $602_1$ to $602_k$ store k powers in turn.

The sorting circuit 603 sorts out the stored k powers and the lastly calculated power in turn from large to small or from small to large and outputs the intermediate value of power that is the value of the (k/2)+1-th power as a median value of powers 604.

Note that the sorting circuit 603 outputs the (k+1)/2-th or (k+3)/2-th value if k is an odd number.

Continuously, the fourth embodiment is explained.

The fourth embodiment is the same as the first embodiment except for substituting the power calculation circuit in the first embodiment by a mode of power calculation circuit for calculating a mode of power.

It is to be noted that only the arbitrary power calculation circuit $700i$ is explained briefly because the other parts are the same as those of the first embodiment.

Figure 8:
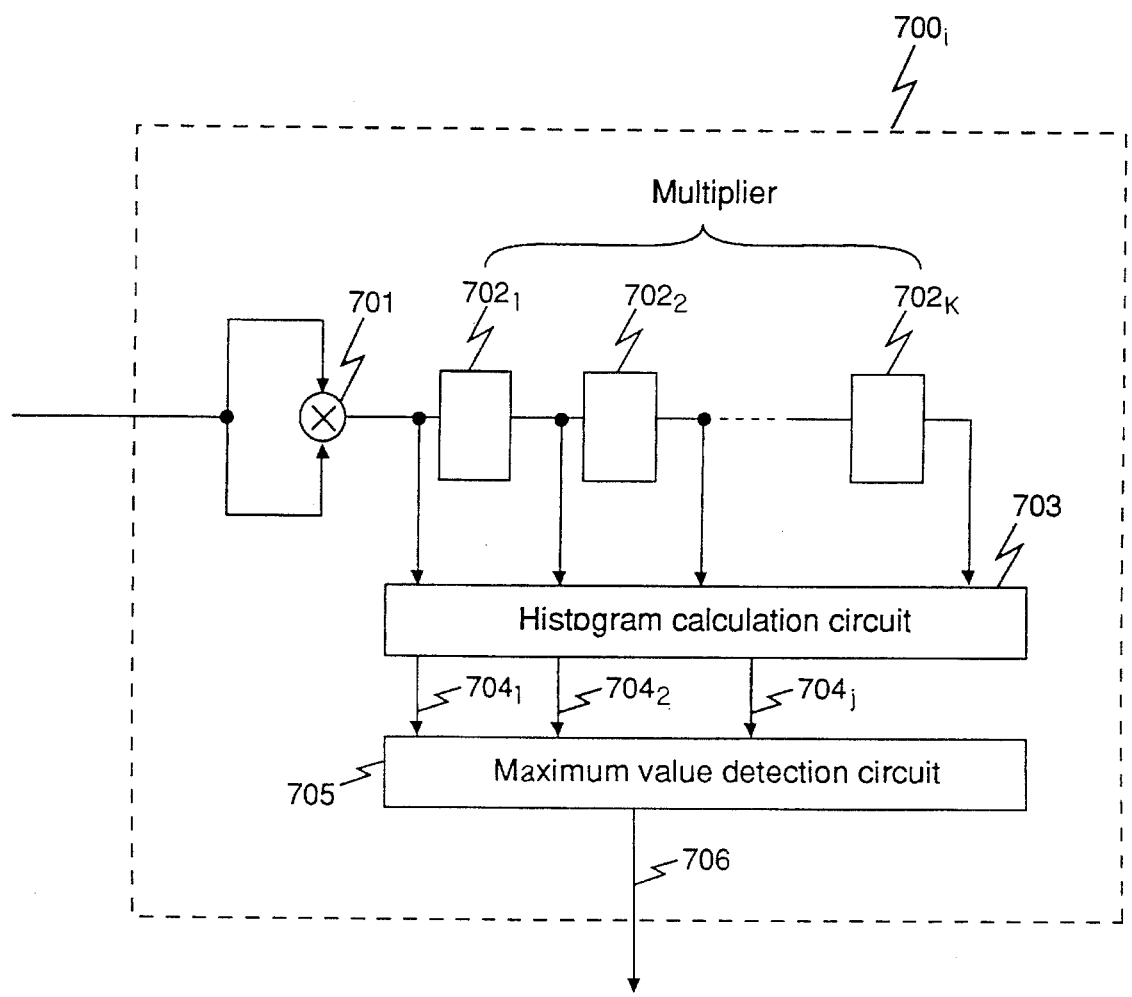
FIG. 8 is a block diagram of the fourth embodiment of a power calculation circuit.

FIG. 8 shows a block diagram of a mode of power calculation circuit.

First, the multiplier 701 calculates a power by squaring a reception signal and outputs the result.

The registers $702_1$ to $702_k$ stores k powers in turn.

The histogram calculation circuit 703 calculates a histogram based on stored k powers and the lastly calculated a power in turn and outputs the resulted histogram signals $704_1, \ldots, 704_j$.

The maximum value detection circuit 705 outputs a central value of a zone having maximum value in the histogram as an mode of power 706 based on the histogram signals $704_1, \ldots, 704_j$.

Next, the fifth embodiment is explained.

Figure 9:
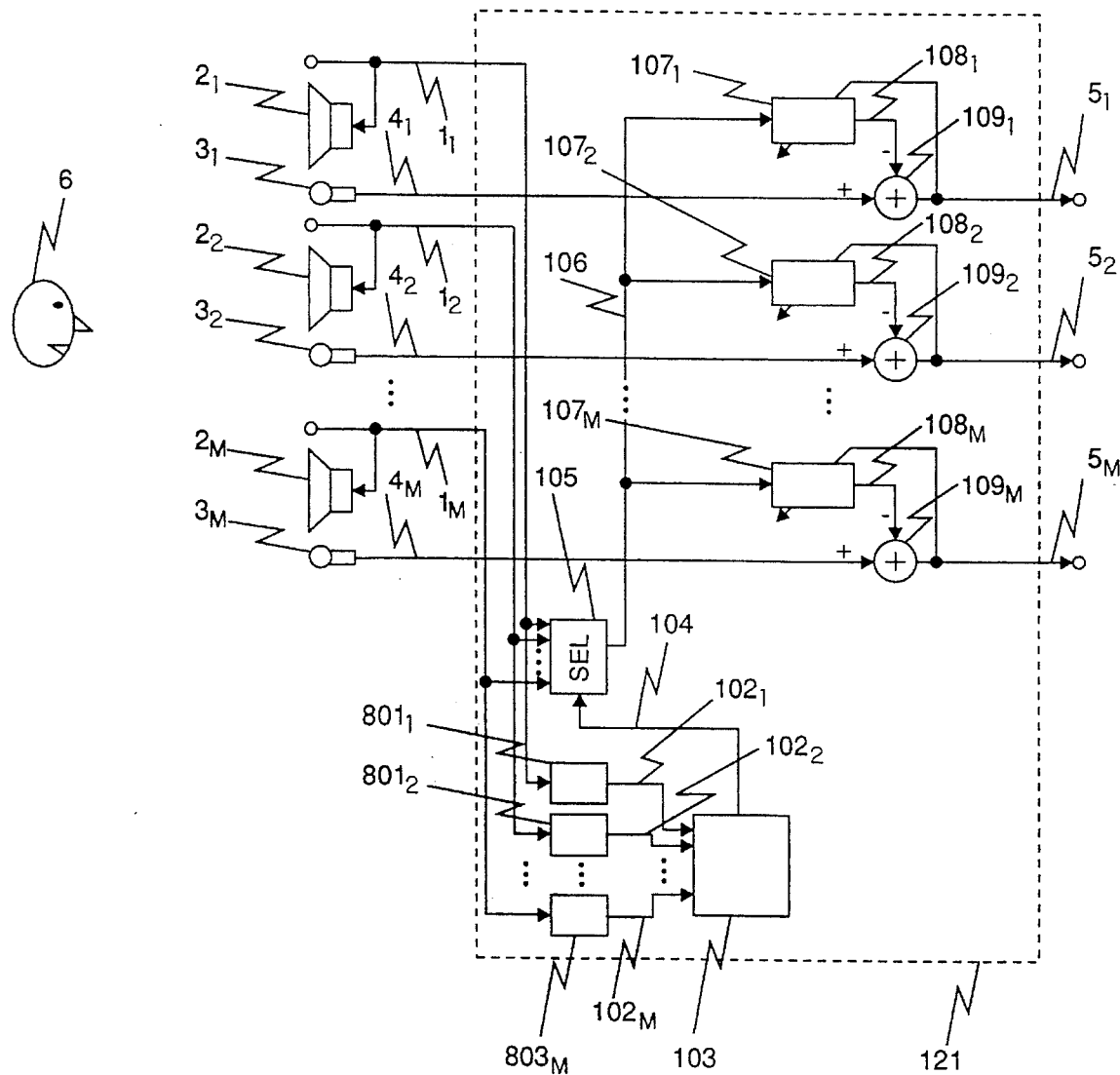
FIG. 9 is a block diagram of the second embodiment of the present invention.
Figure 10:
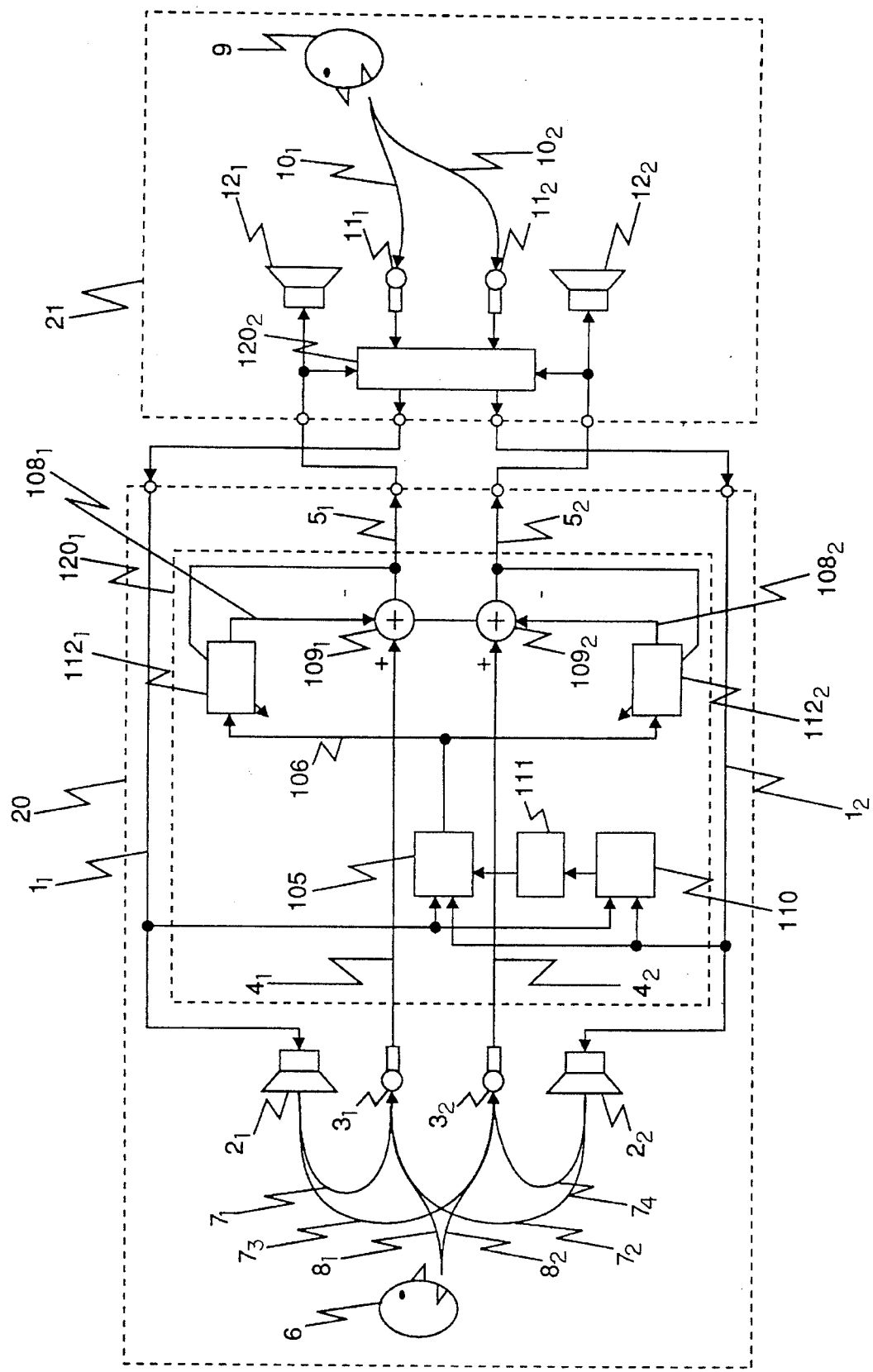
FIG. 10 is a block diagram of a conventional multi-channel echo canceller.

FIG. 9 shows the fifth embodiment of the present invention in case that the reception signal and the transmission signal are of M-channel, respectively.

121 is the multi-channel echo cancelling device.

The fifth embodiment is the same as the first embodiment except for substituting the power calculation circuits $101_1, \ldots, 101_M$ in the first embodiment by the absolute value calculation circuits $801_1, \ldots, 801_M$.

The absolute value calculation circuits $801_1, \ldots, 801_M$ calculates and outputs an absolute value of the reception signal.

It is to be noted in this case that it is good to use an average of absolute value, median of absolute value and mode of the absolute value, similarly to the abovementioned second embodiment, the third embodiment and the fourth embodiment. Moreover, for this case the absolute value calculation circuit 801 can be used instead of the multiplier 501, the multiplier 601 or the multiplier 701.

What is claimed is:

1. A multi-channel echo cancelling method comprising:
a step of calculating a power of reception signal in each reception channel and selecting a reception channel of a reception signal having the biggest power;
a step of generating an echo replica corresponding to an echo in each mixed signal generated by propagation of reception signals of said reception channels based on said reception signal of the reception channel selected in the previous step for each reception channel; and
a step of cancelling said echo from said mixed signal by subtracting said echo replica from said mixed signal for each reception channel.

2. The multi-channel echo cancelling method of claim 1, wherein said step of calculating a power of reception signal in each reception channel and selecting a reception channel of a reception signal having the biggest power calculates a square value of reception signal in each reception channel and selects a reception channel having the biggest square value.

3. The multi-channel echo cancelling method of claim 1, wherein said step of calculating a power of reception signal in each reception channel and selecting a reception channel of a reception signal having the biggest power calculates an instantaneous power of reception signal in each reception channel and selects a reception channel having the biggest instantaneous power.

4. The multi-channel echo cancelling method of claim 1, wherein said step of calculating a power of reception signal in each reception channel and selecting a reception channel of a reception signal having the biggest power calculates a mean value of powers of reception signals in each reception channel and selects a reception channel having the biggest mean value of powers.

5. The multi-channel echo cancelling method of claim 1, wherein said step of calculating a power of reception signal in each reception channel and selecting a reception channel of a reception signal having the biggest power calculates powers of reception signals in each reception channel, sorts the results and selects a reception channel having the biggest median value of powers.

6. The multi-channel echo cancelling method of claim 1, wherein said step of calculating a power of reception signal in each reception channel and selecting a reception channel of a reception signal having the biggest power calculates a mode of powers of reception signals in each reception channel and selects a reception channel having the biggest mode of powers.

7. The multi-channel echo cancelling method of claim 1, wherein said step of generating an echo replica corresponding to an echo in each mixed signal generated by propagation of reception signals of said reception channels based on said reception signal of the reception channel selected in the previous step for each reception channel supplies said reception signal of the selected reception channel to adaptive filters that are one-to-one corresponding to said mixed signals and generates said echo replicas using said adaptive filters.

8. A multi-channel echo cancelling method comprising:
a step of calculating an absolute value of reception signal in each reception channel and selecting a reception channel of a reception signal having the biggest absolute value;
a step of generating an echo replica corresponding to an echo in each mixed signal generated by propagation of reception signals of said reception channels based on said reception signal of the reception channel selected in the previous step for each reception channel; and
a step of cancelling said echo from said mixed signal by subtracting said echo replica from said mixed signal for each reception channel.

9. The multi-channel echo cancelling method of claim 8, wherein said step of calculating an absolute value of reception signal in each reception channel and selecting a reception channel of a reception signal having the biggest absolute value calculates a mean value of absolute values of reception signals in each reception channel and selects a reception channel having the biggest mean value of absolute values.

10. The multi-channel echo cancelling method of claim 8, wherein said step of calculating an absolute value of reception signal in each reception channel and selecting a reception channel of a reception signal having the biggest absolute value calculates absolute values of reception signals in each reception channel, sorts the results and selects a reception channel having the biggest median value of absolute values.

11. The multi-channel echo cancelling method of claim 8, wherein said step of calculating an absolute value of a reception signal in each reception channel and selecting a reception channel of a reception signal having the biggest absolute value calculates a mode of absolute values of reception signals in each reception channel and selects a reception channel having the biggest mode of absolute values.

12. The multi-channel echo cancelling method of claim 8, wherein said step of generating an echo replica corresponding to an echo in each mixed signal generated by propagation of reception signals of said reception channels based on said reception signal of the reception channel selected in the previous step for each reception channel supplies said reception signal of the selected reception channel to adaptive filters that are one-to-one corresponding to said mixed signals and generates said echo replicas using said adaptive filters.

13. A multi-channel echo cancelling device comprising:
a reception signal selection means for calculating a power of reception signal in each reception channel and selecting a reception channel of a reception signal having the biggest power;
a means for generating an echo replica corresponding to an echo in each mixed signal generated by propagation of reception signals of said reception channels based on said reception signal of the reception channel selected by said reception signal selection means for each reception channel; and
a means for cancelling said echo from said mixed signal by subtracting said echo replica from said mixed signal for each reception channel.

14. The multi-channel echo cancelling device of claim 13, wherein said means for calculating a power of reception signal in each reception channel and selecting a reception channel of a reception signal having the biggest power comprises:
a plurality of power calculation means, one-to-one corresponding to each reception signal, for calculating a power of reception signal of said reception channel;
a reception channel selection means for selecting a reception channel having the biggest power of reception signal based on the calculation result from said power calculation means; and
a selection means for receiving reception signals of reception channels and outputting a reception signal of a selected reception channel based on the selected result by said reception channel selection means.

15. The multi-channel echo cancelling device of claim 14, wherein said power calculation means comprises a multiplication means for receiving a reception signal of said reception channel and squaring this reception signal and outputting a result.

16. The multi-channel echo cancelling device of claim 14, wherein said power calculation means comprises:
a multiplication means for receiving a reception signal of said reception channel and squaring this reception signal and outputting a result; and
a mean calculation means for storing square values calculated by said multiplication means and calculating a mean power of reception signal from said square values.

17. The multi-channel echo cancelling device of claim 14, wherein said power calculation means comprises:
a multiplication means for receiving a reception signal of said reception channel and squaring this reception signal and outputting a result;
a register means for storing square values calculated by said multiplication means; and
a sorting means for sorting square values stored in said register means and outputting an median value of the sorted square values.

18. The multi-channel echo cancelling device of claim 14, wherein said power calculation means comprises:
a multiplication means for receiving a reception signal of said reception channel and squaring this reception signal and outputting a result;
a register means for storing square values calculated by said multiplication means;
a histogram means for calculating a histogram from square values stored in said register means; and
a maximum value detection means for outputting a representative value of a zone having maximum value in said histogram.

19. The multi-channel echo cancelling device of claim 13, wherein said means for generating an echo replica corresponding to an echo in each mixed signal generated by propagation of reception signals of said reception channels, based on said reception signal of the reception channel selected by said reception signal selection means, comprises a plurality of adaptive filters one-to-one corresponding to said mixed signals.

20. The multi-channel echo cancelling device of claim 19, wherein said adaptive filter is an adaptive transversal filter based on the LMS algorism.

21. The multi-channel echo cancelling device of claim 19, wherein said adaptive filter is an adaptive transversal filter based on the learning identification method.

22. The multi-channel echo cancelling device of claim 14, wherein said means for cancelling said echo from said mixed signal by subtracting said echo replica from said mixed signal for each reception channel comprises a plurality of subtraction means, one-to-one corresponding to said mixed signals, for subtracting said echo replica from said mixed signal.

23. A multi-channel echo cancelling device comprising:
a means for calculating an absolute value of reception signal in each reception channel and selecting a reception channel of a reception signal having the biggest absolute value;
a means for generating an echo replica corresponding to an echo in each mixed signal generated by propagation of reception signals of said reception channels based on said reception signal of the reception channel selected by said reception signal selection means for each reception channel; and
a means for cancelling said echo from said mixed signal by subtracting said echo replica from said mixed signal for each reception channel.

24. The multi-channel echo cancelling device of claim 23, wherein said means for calculating an absolute value of reception signal in each reception channel and selecting a reception channel of a reception signal having the biggest absolute value comprises:
a plurality of absolute value calculation means, one-to-one corresponding to each reception signal, for calculating an absolute value of reception signal of said reception channel;
a reception channel selection means for selecting a reception channel having the biggest absolute value of reception signal based on the calculation result from said absolute value calculation means; and a selection means for receiving reception signals of reception channels and outputting a reception signal of a selected reception channel based on the selected result by said reception channel selection means.

25. The multi-channel echo cancelling device of claim 24, wherein said absolute value calculation means comprises:

an absolute value calculation means for calculating an absolute value of a reception signal of said reception channel for each reception channel; and a mean calculation means for storing absolute values calculated by said absolute value calculation means and calculating a mean value of absolute values of a reception signal from said absolute values.

26. The multi-channel echo cancelling device of claim 24, wherein said absolute value calculation means comprises:

an absolute value calculation means for calculating an absolute value of a reception signal of said reception channel for each reception channel;

a register means for storing absolute values calculated by said absolute value calculation means; and a sorting means for sorting absolute values stored in said register means and outputting an median value of the sorted square values.

27. The multi-channel echo cancelling device of claim 23, wherein said absolute value calculation means comprises:

an absolute value calculation means for calculating an absolute value of a reception signal of said reception channel for each reception channel;

a register means for storing absolute values calculated by said absolute value calculation means;

a histogram means for calculating a histogram from absolute values stored in said register means; and a maximum value detection means for outputting a representative value of a zone having maximum value in said histogram.

28. The multi-channel echo cancelling device of claim 23, wherein said means for generating an echo replica corresponding to an echo in each mixed signal generated by propagation of reception signals of said reception channels based on said reception signal of the reception channel selected by said reception signal selection means comprises a plurality of adaptive filters one-to-one corresponding to said mixed signals.

29. The multi-channel echo cancelling device of claim 28, wherein said adaptive filter is an adaptive transversal filter based on the LMS algorism.

30. The multi-channel echo cancelling device of claim 28, wherein said adaptive filter is an adaptive transversal filter based on the learning identification method.

31. The multi-channel echo cancelling device of claim 23, wherein said means for cancelling said echo from said mixed signal by subtracting said echo replica from said mixed signal for each reception channel comprises a plurality of subtraction means, one-to-one corresponding to said mixed signals, for subtracting said echo replica from said mixed signal.

32. A multi-channel echo cancelling device comprising:

a plurality of power calculation means, one-to-one corresponding to each reception signal, for calculating a power of reception signal of said reception channel;

a reception channel selection means for selecting a reception channel having the biggest power of reception signal based on the calculation result from said power calculation means;

a selection means for receiving reception signals of reception channels and outputting a reception signal of a selected reception channel based on the selected result by said reception channel selection means;

a plurality of adaptive filters, one-to-one corresponding to mixed signals in which echoes generated by propagation of reception signals of said reception channels are mixed, for generating echo replicas corresponding to said echoes based on a reception signal supplied by said selection means; and a plurality of subtraction means, one-to-one corresponding to said mixed signals, for outputting a result by subtracting said echo replicas from said mixed signals.

33. The multi-channel echo cancelling device of claim 32, wherein said power calculation means is substituted by said absolute value calculation means for calculating an absolute value of a reception signal of said reception channel.

* * * * *

UNITED STATES PATENT AND TRADEMARK OFFICE
CERTIFICATE OF CORRECTION

PATENT NO.    : 5,513,265
DATED         : April 30, 1996
INVENTOR(S)   : Akihiro HIRANO It is certified that error(s) appears in the above-identified patent and that said Letters Patent is hereby corrected as shown below:

| | | |
|---|---|---|
| Column 1, | line 55, | delete "112" and insert --$11_2$--; |
| | line 58, | delete "12" and insert --$1_2$--; |
| | line 60, | delete "$1_2$" and insert --$1_1$--. |
| Column 2, | line 37, | delete "$112_2$" and insert --$112_1$--; |
| | line 42, | delete "$112_2$" and insert --$112_1$--; |
| | line 45, | delete "$112_2$" and insert --$112_1$--. |
| Column 7, | line 35, | delete "$3_1, \ldots 3_1$," and insert --$3_1, \ldots, 3_M$--; |
| | line 57, | delete "li" and insert --$1_i$--. |
| Column 8, | line 63, | delete "$x_j$" and insert --$y_j$--. |
| Column 11, | line 14, | delete "700i" and insert --$700_i$--. |

Signed and Sealed this

Twentieth Day of August, 1996

Attest:

BRUCE LEHMAN

*Attesting Officer*         *Commissioner of Patents and Trademarks*